(12) United States Patent
Song et al.

(10) Patent No.: US 6,319,984 B1
(45) Date of Patent: Nov. 20, 2001

(54) BIODEGRADABLE AND THERMOSENSITIVE POLYPHOSPHAZENES AND THEIR PREPARATION METHOD

(75) Inventors: Soo-Chang Song; Youn Soo Sohn; Bae Hoon Lee; Sang Beom Lee, all of Seoul (KR)

(73) Assignee: Korea Institute of Science and Technology, Seoul (KR)

(*) Notice: Subject to any disclaimer, the term of this patent is extended or adjusted under 35 U.S.C. 154(b) by 0 days.

(21) Appl. No.: 09/546,566

(22) Filed: Apr. 11, 2000

(30) Foreign Application Priority Data

Nov. 17, 1999 (KR) .................................................. 99-51049

(51) Int. Cl.$^7$ .................................................. C08G 79/02
(52) U.S. Cl. ............................................................. 525/54.1
(58) Field of Search ............................................. 525/54.1

(56) References Cited

U.S. PATENT DOCUMENTS 5,414,025  5/1995  Allcock et al. .

FOREIGN PATENT DOCUMENTS

19613048 A1  10/1996  (DE) .
0442784 A1   2/1991   (EP) .

OTHER PUBLICATIONS

K. Park, Ed., Controlled Drug Delivery, ACS Professional Reference Book, 1997; pp. 485–488.
B. Jeong, "Biodegradable block copolymers as injectable drug–delivery systems", Nature, v. 388, Aug. 1997; p. 860–862.

International Search Report for PCT/KR00/00059.

Y. S. Sohn et al., "Synthesis and properties of low molecular weight polyphosphazenes", Macromolecules, v. 28, No. 22, pp. 7566–7568; 1995.

S. Song et al., A new class of biodegradable thermosensitive polymers . . . , Macromolecules, v. 32, No. 7, pp. 2188–2193; 1999.

*Primary Examiner*—Nathan M. Nutter
(74) *Attorney, Agent, or Firm*—Morrison & Foerster LLP

(57) ABSTRACT

The present invention relates to novel biodegradable polyphosphazenes represented by Formula 1 and a preparation method thereof. Polyphosphazenes of the present invention not only have thermosensitivity and biodegradability simultaneously, but also their phase transition temperature and degradation rate can be controlled.

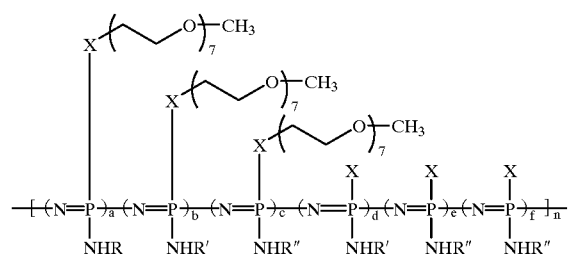

(1)

17 Claims, No Drawings

BIODEGRADABLE AND THERMOSENSITIVE POLYPHOSPHAZENES AND THEIR PREPARATION METHOD

BACKGROUND OF THE INVENTION

The present invention relates to a novel biodegradable polyphosphazene represented by Formula 1 that undergoes phase transition as the temperature changes and the preparation method thereof. More particularly, the present invention relates to a novel biodegradable polyphosphazene that undergoes a sol-gel or sol-solid phase transition as the temperature changes and the preparation method thereof.

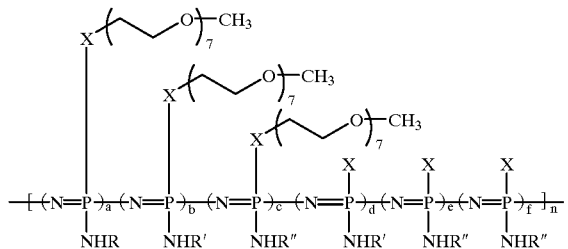

(1)

(wherein X is O or NH, NHR is a depsipeptide selected from ethyl-2-(O-glycyl)glycolate ($NHCH_2COOCH_2COOC_2H_5$) or ethyl-2-(O-glycyl)lactate ($NHCH_2COOCH(CH_3)COOC_2H_5$), NHR' is an amino acid ethyl ester selected from glutamic acid diethy ester ($NHCH(CH_2CH_2COOC_2H_5)COOC_2H_5$), phenylalanine ethyl ester ($NHCH(C_7H_7)COOC_2H_5$), valine ethyl ester ($NHCH(CH(CH_3)_2)COOC_2H_5$), or leucine ethyl ester ($NHCH(CH_2CH(CH_3)_2)COOC_2H_5$), NHR" is glycine ethyl ester ($NHCH_2COOC_2H_5$) or alanine ethyl ester ($NHCH(CH_3)COOC_2H_5$) and a, b, c, d, e and f are mole fractions of each copolymer that have values between 0~1.0 with a relationship a+b+c+d+e+f=1.0. Also n is a degree of polymerization of polyphosphazene and is between 100~1000.)

A temperature-sensitive polymer refers to a polymer that undergoes a liquid to solid or liquid to gel phase transition, due to the large difference in solubility, as the temperature of the aqueous solution changes. The phase transition is reversible. At low temperatures, water molecules are bound to the hydrophilic moiety of the polymers by hydrogen bonding. As the temperature increases, the hydrogen bonding weakens resulting in a release of the water molecules, and the hydrophobic interaction becomes stronger during the process resulting in precipitation of the polymer. This type of phase transition temperature is called the lower critical solution temperature (LCST). Therefore, the phase transition temperature of the temperature-sensitive polymer increases as the content of the hydrophilic moiety in the polymer increases, and decreases as the content of the hydrophobic moiety increases. Studies for application using such thermosensitive polymers are actively underway in the fields of biomedical materials including drug delivery systems, environmental sciences, biological sciences, and cosmetics.

Thermosensitivity is reported for poly(N-isopropyl acrylamide) or polyethylene oxide copolymer, hydroxy group polymers and a number of polyphosphazenes (K. Park Eds, Controlled Drug Delivery, 485 (1997)). Most thermosensitive polymers, however are not degradable, and therefore are not suitable as a material for drug delivery (B. Jeong et. al., Nature, 388, 860 (1997)).

The present inventors have reported that poly (organophosphazenes), which can be obtained by substitution of polydichlorophosphazene with methoxy-poly (ethylene glycol) and amino acid ester, dissolve in water at low temperatures but precipitate out as a solid above the LCST and slowly hydrolyze in an aqueous environment (S. C. Song et. al., *Macromolecules*, 32, 2188 (1999)).

However, these synthetic polymers were found to be unsuitable as biomaterials since the LCST of most of these polymers are above the body temperature and their hydrolysis rate is too slow. Therefore, it was necessary to synthesize polymers having a desired hydrolysis rate and the LCST. Thus, the present inventors have found that polymers can be designed and synthesized to have the phase transition temperature and hydrolysis rate suitable as biomaterials by introducing a depsipeptide as a third side group and more hydrophobic amino acid ester in the polymer backbone. The LCST of thus synthesized polymers is in the vicinity of the body temperature, and the hydrolysis rate increases as the depsipeptide content increases.

DISCLOSURE OF THE INVENTION

An object of the present invention is to provide novel polyphosphazenes that are temperature-sensitive and whose biodegradation rate can be controlled.

More particularly, the object of the present invention is to provide polyphosphazenes whose temperature-sensitivity and biodegradability can be controlled as desired by substituting polydichlorophosphazene with methoxy-poly (ethylene glycol) and amino acid ester and a preparation method thereof.

To achieve these objects, polydichlorophosphazene was reacted with methoxy-poly(ethylene glycol), and then successive substitution reactions, were carried out using a variety of amino acid esters and depsipeptides. The present inventors have found that the polyphosphazene derivatives can be designed and synthesized to have desirable phase transition temperatures near the body temperature and the appropriate rates of hydrolysis therefof. More particularly, it has been found that the phase transition temperature and degradation rate of these polyphosphazenes can be controlled depending on the composition of methoxy-poly (ethylene glycol) and amino acid ester, the kinds of amino acid ester used, and the content of depsipeptide.

DETAILED DESCRIPTION OF THE INVENTION

The preparation method of polyphosphazene represented by Formula 1 can be explained in more detail as follows. Vacuum or nitrogen lines are used to avoid moisture in all of the preparation processes. Water was removed sufficiently for all of the solvents used in the process. Low molecular weight (Mw=$10^4$~$10^5$) polydichlorophosphazene linear polymer, ($N=PCl_2$)$_n$, is obtained by thermal polymerization of cyclotriphosphazene, ($N=PCl_2$)$_3$ according to the literature (Y. S. Sohn, et. al., *Macromolecules*, 28, 7566(1995)).

That is, 2.0 g(17.26 mmol) of hexachlorocyclotriphosphazene of Formula 2 which has been purified by sublimation and 3~10% $AlCl_3$ with respect to the hexachlorocyclotriphosphazene are mixed in a glass tube reactor and sealed. The glass reactor is rotated at 1 revolution per minute (rpm) and reacted for 5 hours at 230–250° C. to obtain polydichlorophosphazene of Formula 3.

(1)

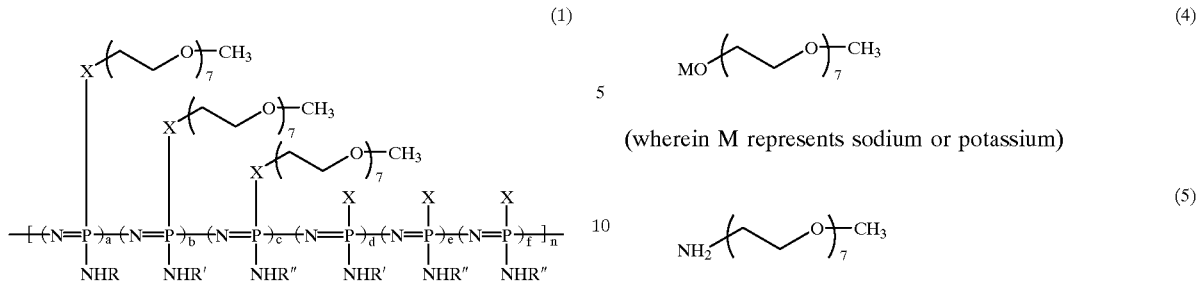

(wherein X is O or NH, NHR is a depsipeptide selected from ethyl-2-(O-glycyl)glycolate ($NHCH_2COOCH_2COOC_2H_5$) or ethyl-2-(O-glycyl)lactate ($NHCH_2COOCH(CH_3)COOC_2H_5$), NHR' is an amino acid ethyl ester selected from glutamic acid diethyl ester ($NHCH(CH_2CH_2COOC_2H_5)COOC_2H_5$), phenyl alanine ethyl ester ($NHCH(C_7H_7)COOC_2H_5$), valine ethyl ester ($NHCH(CH(CH_3)_2)COOC_2H_5$) or leucine ethyl ester ($NHCH(CH_2CH(CH_3)_2)COOC_2H_5$), NHR" is glycine ethyl ester ($NHCH_2COOC_2H_5$) or alanine ethyl ester ($NHCH(CH_3)COOC_2H_5$) and a, b, c, d, e and f are mole fractions of each copolymer that have values between 0~1.0 with a relationship a+b+c+d+e+f=1.0. Also n is a degree of polymerization of polyphosphazene and is between 100~1000.)

(2)

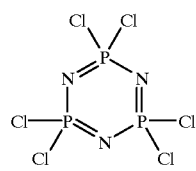

(3)

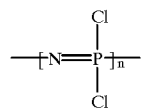

To 200 g of methoxy-poly(ethylene glycol) is added 200 ml of benzene, and the solution mixture is distilled azeotropically at 70~80° C. to remove excess water, followed by vacuum-dry at 80~90° C. in oil bath for 3 days. To this, sufficient amount of 3 Å molecular sieve is added and dry nitrogen is filled to keep drying condition until next step reaction. For reactions with polydichlorophosphazene of Formula 3, the hydroxy group of methoxy-poly(ethylene glycol) is converted to alkoxide form of Formula 4 or to amino group to make α-amino-ω-methoxy-poly(ethylene glycol) of Formula 5. The process of converting the hydroxy group to amino group is as follows. One equivalent weight of methoxy-poly(ethylene glycol), two equivalent weights of 4-toluenesulfonylchloride and 4 equivalent weights of triethylamine is mixed and stirred for 12 hours in dried chloroform, and further reacted with two equivalent weights of sodium azide in dimethylformamide for additional 12 hours at 80° C. Methoxy-poly(ethylene glycol) azide is further reacted with 10% palladium/charcoal catalysts under 3.4 atmospheric hydrogen gas for 48 hours to produce α-amino-ω-methoxy-poly(ethylene glycol) of Formula 5.

(4)

(wherein M represents sodium or potassium)

(5)

Polydichlorophosphazene of Formula 3, is reacted with 0~2 equivalent weights of methoxy-poly(ethylene glycol) depending on the composition of the desired copolymer in the presence of 2 equivalent weights of triethylamine. For this reaction methoxy-poly(ethylene glycol) may be reacted either in alcoholic form or alkoxide form of Formula 4 obtainable by reacting sodium or potassium metal corresponding to 1.1~2 equivalent weights of polydichlorophosphazene with methoxy-poly(ethylene glycol) in tetrahydrofuran. To this solution polydichlorophosphazene in the same solvent is added dropwise and reacted for 5 hours at room temperature. Subsequently, depsipeptide of Formula 6 and triethylamine in acetonitrile are added to this polymer solution dropwise and reacted for 15~20 hours in an ice bath. Hydrogen chloride salt of glutamic acid diethyl ester, phenylalanine ethyl ester, valine ethyl ester, or leucine ethyl ester of Formula 7 and triethylamine dissolved in tetrahydrofuran are added dropwise to the polymer solution, which was stirred for 48 hours at room temperature. Thus obtained reaction solution is finally reacted with hydrogen chloride salt of glycine ethyl ester or alanine ethyl ester of Formula 8 for 48 hours.

It is also possible to change the order of the reactions as follows. That is, after reacting polydichlorophosphazene of Formula 3 with depsipeptide of Formula 6 and amino acid ester of Formula 7 in the presence of triethylamine, then aminomethoxy-poly(ethylene glycol) of Formula 5 may be reacted with unsubstituted chlorine in the presence of triethylamine.

$H_2NR$ (6)

$H_2NR'$ (7)

$H_2NR"$ (8)

(wherein $H_2NR$, $H_2NR'$, and $H_2NR"$ are identical to those defined in Formula 1) Depsipeptide ethyl esters of Formula 6 are reacted as an oxalate salt form, and amino acid ethyl esters of Formulas 7 and 8 are reacted as hydrogen chloride salt or sulfuric acid salt form, preferably as a hydrogen chloride salt form for the reaction.

The reaction mixture is centrifuged or filtered to remove the precipitates ($Et_3N$. HCl or NaCl). The filtrate is concentrated at reduced pressure until only a small amount of solvent remained. Unreacted methoxy-poly(ethylene glycol) and amino acid estersor depsipeptide ethyl esters are removed by dissolution of the concentrated product in chloroform and precipitation by adding an excess amount of ethyl ether or n-hexane to the solution. This procedure is repeated 2~3 times. The precipitate is dried under vacuum to obtain the final polymer product represented by Formula 1.

The following Reaction Scheme 1 illustrates an example of preparing biodegradable polyphosphazenes of Formula 1 according to the present invention.

Reaction Scheme 1

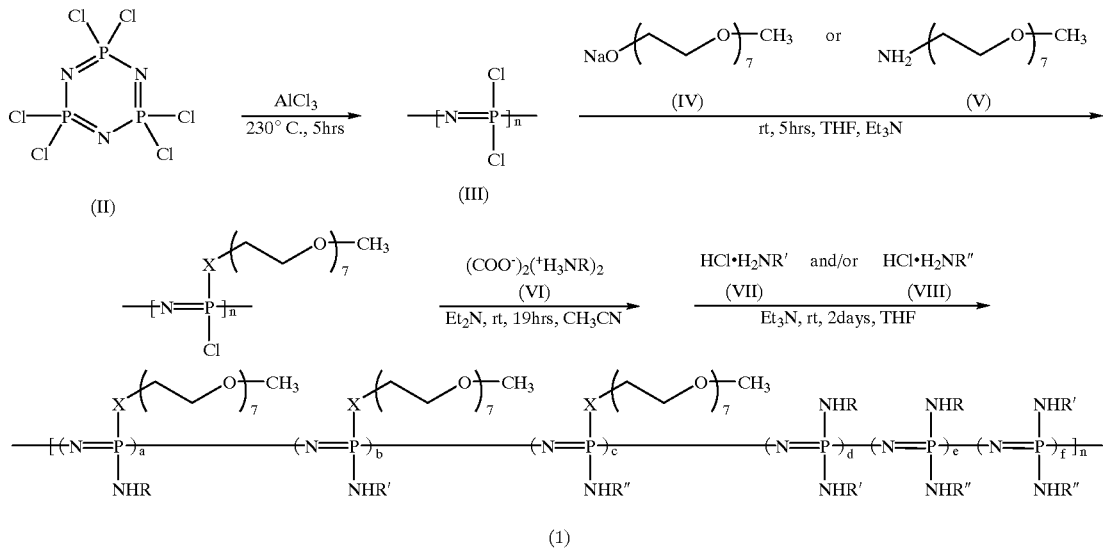

(1)

X=O, NH

H₂NR=H₂NCH₂COOCH₂COOC₂H₅ (Ethyl-2-(O-glycy)glycolate, GlyGlcOEt) H₂NCH₂COOCH(CH₃)COOC₂H₅ (Ethyl-2-(O-glycy)lactate, GlyLacOEt)

H₂NR'=H₂NCH(CH₂C₆H₅COOC₂H₅ (Phenylalanine ethyl ester, PheOEt) H₂NCH(CH₂CH₂)COOC₂H₅)COOC₂H₅ (Glutamic diethyl ester, GluOEt) H₂NCH(CH(CH₃)₂COOC₂H₅ (Valine ethyl ester, ValOEt) H₂NCH(CH₂CH(CH₃)₂)COOC₂H₅ (Leucine ethyl ester, LeuOEt)

H₂NR"=H₂NCH₂COOC₂H₅ (Glycine ethyl ester, GlyOEt) H₂NCH(CH₃)COOC₂H₅ (Alanine ethyl ester, AlaOEt)

The invention will be further illustrated by the following examples, but not limited to the examples given.

The elemental analysis of the compounds of the present invention was performed at the Chemical Analysis Center of the Korea Institute of Science and Technology by using the Perkin-Elmer C, H, N analyzer. Proton and $^{31}$P-NMR spectra were measured by using Varian Gemini-300, and glass transition temperature ($T_g$) was measured by Du Pont 1090 differential thermal analysis system. The average molecular weight (Mw) was determined by gel permeation chromatography using Waters 510 pump and 410 differential refractive index detector. And the lower critical solution temperatures (LCST) were estimated using Perkin-Elmer Lamda18 UV/VIS spectrophotometer.

EXAMPLE 1

Preparation of Poly[(Methoxy-poly(ethylene Glycol))(glycine Ethyl Ester)(ethyl-2-(O-glycyl)glycolate)phosphazene], [NP(MPEG350)$_{0.73}$(GlyOEt)$_{1.20}$(GlyGlycOEt)$_{0.07}$]$_n$ The sodium salt of methoxy-poly(ethylene glycol) was prepared by refluxing the mixture solution of methoxy-poly(ethylene glycol) with a molecular weight of 350 (4.83 g, 13.8 mmol) and sodium metal (0.35 g, 15.2 mmol) in dry tetrahydrofuran for 48 hours in nitrogen atmosphere. To a solution of poly(dichlorophosphazene) (2.00 g, 17.3 mmol) in tetrahydrofuran in a dry ice-acetone bath, the solution of sodium salt of methoxy-poly(ethylene glycol) prepared above was added dropwise. After 30 minutes, the dry ice-acetone bath was removed and the mixture was stirred at room temperature for 5 hours. To this mixture, triethylamine (0.35 g, 3.45 mmol) and ethyl-2-(O-glycyl)glycolate ammonium oxalic acid salt (0.36 g, 0.86 mmol) dissolved in acetonitrile (50 ml) were added and the reaction mixture was reacted for 19 hours in an ice-water bath. Finally, triethylamine (7.7 g, 75.9 mmol) and glycine ethyl ester hydrogen chloride salt (5.23 g, 37.95 mmol) were added to the reaction mixture, which was stirred for 48 hours at room temperature. The reaction mixture was centrifuged or filtered to remove the precipitates (Et₃N.HCl or NaCl). The filtrate was concentrated at reduced pressure until only a small amount of solvent remained. The concentrated product was dissolved in chloroform, to which excess amount of ethyl ether or n-hexane was added to induce precipitation. After repeating this procedure 2~3 times, the precipitate was vacuum-dried to obtain 5.2 g of the final polymer product [NP(MPEG350)$_{0.73}$(GlyOEt)$_{1.20}$(GlyGlycOEt)$_{0.07}$]$_n$ (yield: 75%).

Molecular formula: $C_{25}H_{49}N_3O_{14}P$
Elemental analysis (%): C, 36.91; H, 6.23; N, 7.00; P, 7.44
Theoretical value: C, 36.50; H, 6.90; N, 7.28; P, 7.71
$^1$H-NMR spectrum(CDCl₃, ppm):
δ1.1–1.3 (b, 6H, —NHCH₂COOCH₂C$\underline{H_3}$, —NHCH₂COOCH₂COOCH₂C$\underline{H_3}$),
δ3.4 (s, 3H, —O(CH₂CH₂O)₇C$\underline{H_3}$),
δ3.5–3.9 (b, 30H, —OC$\underline{H_2}$C$\underline{H_2}$O(C$\underline{H_2}$C$\underline{H_2}$O)₆CH₃, —NHC$\underline{H_2}$COOCH₂CH₃, —NHC$\underline{H_2}$COOC$\underline{H_2}$COOCH₂CH₃),
δ4.0–4.4 (b, 6H, —OCH₂C$\underline{H_2}$O(CH₂C$\underline{H_2}$O)₆CH₃, —NHCH₂COOC$\underline{H_2}$CH₃ —NHCH₂COOCH₂COOC$\underline{H_2}$CH₃),
δ4.5–4.7 (b, 2H, —NHCH₂COOC$\underline{H_2}$COOCH₂CH₃)
$^{31}$P-NMR spectrum(CDCl₃, ppm): δ18.2
Average molecular weight (M$_w$): 165000
Glass transition temperature(Tg): −71° C.
LCST: 54° C.

EXAMPLE 2

Preparation of Poly[(methoxy-poly(ethylene Glycol))(glycine Ethyl Ester)(ethyl-2-(O-glycyl)glycolate)

phosphazene], [NP(MPEG350)$_{1.00}$(GlyOEt)$_{0.82}$(GlyGlycOEt)$_{0.18}$]$_n$

The final polymer product [NP(MPEG350)$_{1.00}$(GlyOEt)$_{0.82}$(GlyGlycOEt)$_{0.18}$]$_n$ (6.4 g, yield: 75%) was obtained by the same procedure as in Example 1 using methoxy-poly(ethylene glycol) having a molecular weight of 350 (6.04 g, 17.3 mmol), sodium metal (0.44 g, 19.0 mmol), poly(dichlorophosphazene) (2.00 g, 17.3 mmol), triethylamine (0.7 g, 6.9 mmol), ethyl-2-(O-glycyl)glycolate ammonium oxalic acid salt (0.71 g, 1.73 mmol), triethylamine (5.6 g, 55.3 mmol) and glycine ethyl ester hydrogen chloride(3.8 g, 27.6 mmol).

Molecular formula: $C_{25}H_{49}N_3O_{14}P$
Elemental analysis (%); C, 41.48; H, 6.75; N, 5.78; P, 5.61
Theoretical value: C, 41.91; H, 6.56; N, 5.52; P, 5.99
$^1$H-NMR spectrum(CDCl$_3$, ppm):
  $\delta$1.1–1.3 (b, 6H, —NHCH$_2$COOCH$_2$C$\underline{H_3}$—NHCH$_2$COOCH$_2$COOCH$_2$C$\underline{H_3}$),
  $\delta$3.4 (s, 3H, —O(CH$_2$CH$_2$O)$_7$C$\underline{H_3}$),
  $\delta$3.5–3.9 (b, 30H, —OC$\underline{H_2}$C$\underline{H_2}$O(C$\underline{H_2}$C$\underline{H_2}$O)$_6$CH$_3$, —NHC$\underline{H_2}$COOC$\underline{H_2}$CH$_3$, —NHC$\underline{H_2}$COOC$\underline{H_2}$COOCH$_2$CH$_3$),
  $\delta$4.0–4.4 (b, 6H, —OC$\underline{H_2}$CH$_2$O(CH$_2$CH$_2$O)$_6$CH$_3$, —NHCH$_2$COOC$\underline{H_2}$CH$_3$, —NHCH$_2$COOC$\underline{H_2}$COOCH$_2$CH$_3$),
  $\delta$4.5–4.7 (b, 2H, —NHCH$_2$COOC$\underline{H_2}$COOCH$_2$CH$_3$)
$^{31}$P-NMR spectrum(CDCl$_3$, ppm): $\delta$17.5
Average molecular weight ($M_w$): 169000
Glass transition temperature(Tg): –54° C.
LCST: 71° C.

EXAMPLE 3

Preparation of Poly[(methoxy-poly(ethylene Glycol))(glycine Ethyl Ester)(ethyl-2-(O-glycyl)glycolate) phosphazene], [NP(MPEG350)$_{0.97}$(GlyOEt)$_{0.95}$(GlyGlycOEt)$_{0.08}$]$_n$ The final polymer product [NP(MPEG350)$_{0.97}$(GlyOEt)$_{0.95}$(GlyGlycOEt)$_{0.08}$]$_n$ (7.2 g, yield: 85%) was obtained by the same procedure as in Example 1 using methoxy-poly(ethylene glycol) having a molecular weight of 350 (6.04 g, 17.3 mmol), sodium metal (0.44 g, 19.0 mmol), poly(dichlorophosphazene) (2.00 g, 17.3 mmol), triethylamine (0.35 g, 3.45 mmol), ethyl-2-(O-glycyl)glycolate ammonium oxalic acid salt (0.36 g, 0.86 mmol), triethylamine (6.3 g, 62.1 mmol) and glycine ethyl ester hydrogen chloride (4.3 g, 31 mmol).

Molecular formula: $C_{25}H_{49}N_3O_{14}P$
Elemental analysis (%): C, 40.43; H, 7.04; N, 5.36; P, 6.04
Theoretical value: C, 40.19; H, 7.61; N, 5.42; P, 5.82
$^1$H-NMR spectrum(CDCl$_3$, ppm):
  $\delta$1.1–1.3 (b, 6H, —NHCH$_2$COOCH$_2$C$\underline{H_3}$, —NHCH$_2$COOCH$_2$COOCH$_2$C$\underline{H_3}$),
  $\delta$3.4 (s, 3H, —O(CH$_2$CH$_2$O)$_7$C$\underline{H_3}$),
  $\delta$3.5–3.9 (b, 30H, —OC$\underline{H_2}$C$\underline{H_2}$O(C$\underline{H_2}$C$\underline{H_2}$O)$_6$CH$_3$, —NHC$\underline{H_2}$COOC$\underline{H_2}$CH$_3$, —NHC$\underline{H_2}$COOC$\underline{H_2}$COOCH$_2$CH$_3$),
  $\delta$4.0–4.4 (b, 6H, —OC$\underline{H_2}$CH$_2$O(CH$_2$CH$_2$O)$_6$CH$_3$, —NHCH$_2$COOC$\underline{H_2}$CH$_3$, —NHCH$_2$COOC$\underline{H_2}$COOCH$_2$CH$_3$),
  $\delta$4.5–4.7 (b, 2H, —NHCH$_2$COOC$\underline{H_2}$COOCH$_2$CH$_3$)
$^{31}$P-NMR spectrum(CDCl$_3$, ppm): $\delta$17.6
Average molecular weight ($M_w$): 166000
Glass transition temperature(Tg): –69° C.
LCST: 70.5° C.

EXAMPLE 4

Preparation of Poly[(methoxy-poly(ethylene Glycol))(glycine Ethyl Ester)(ethyl-2-(O-glycyl)glycolate) phosphazene], [NP(MPEG350)$_{0.97}$(GlyOEt)$_{0.08}$(GlyGlycOEt)$_{0.23}$]$_n$ The final polymer product [NP(MPEG350)$_{0.97}$(GlyOEt)$_{0.80}$(GlyGlycOEt)$_{0.23}$]$_n$ (5.9 g, yield: 68%) was obtained by the same procedure as in Example 1 using methoxy-poly(ethylene glycol) having a molecular weight of 350 (6.04 g, 17.3 mmol), sodium metal (0.44 g, 19.0 mmol), poly(dichlorophosphazene) (2.00 g, 17.3 mmol), triethylamine (1.05 g, 10.4 mmol), ethyl-2-(O-glycyl) glycolate ammonium oxalic acid salt (1.07 g, 2.59 mmol), triethylamine (4.9 g, 48.3 mmol) and glycine ethyl ester hydrogen chloride (3.4 g, 24.2 mmol).

Molecular formula: $C_{25}H_{49}N_3O_{14}P$
Elemental analysis (%): C, 42.32; H, 7.25; N, 5.46; P, 6.28
Theoretical value: C, 42.38; H, 7.72; N, 5.30; P, 5.85
$^1$H-NMR spectrum(CDCl$_3$, ppm):
  $\delta$1.1–1.3 (b, 6H, —NHCH$_2$COOCH$_2$C$\underline{H_3}$—NHCH$_2$COOCH$_2$COOCH$_2$C$\underline{H_3}$),
  $\delta$3.4 (s, 3H, —O(CH$_2$CH$_2$O)$_7$C$\underline{H_3}$),
  $\delta$3.5–3.9 (b, 30H, —OC$\underline{H_2}$C$\underline{H_2}$O(C$\underline{H_2}$C$\underline{H_2}$O)$_6$CH$_3$, —NHC$\underline{H_2}$COOC$\underline{H_2}$CH$_3$, —NHC$\underline{H_2}$COOC$\underline{H_2}$COOCH$_2$CH$_3$),
  $\delta$4.0–4.4 (b, 6H, —OC$\underline{H_2}$CH$_2$O(CH$_2$CH$_2$O)$_6$CH$_3$, —NHCH$_2$COOC$\underline{H_2}$CH$_3$, —NHCH$_2$COOC$\underline{H_2}$COOCH$_2$CH$_3$),
  $\delta$4.5–4.7 (b, 2H, —NHCH$_2$COOC$\underline{H_2}$COOCH$_2$CH$_3$)
$^{31}$P-NMR spectrum(CDCl$_3$, ppm): $\delta$17.5
Average molecular weight($M_w$): 176000
Glass transition temperature(Tg): –61° C.
LCST: 70.5° C.

EXAMPLE 5

Preparation of Poly[(methoxy-poly(ethylene Glycol))(glycine Ethyl Ester)(ethyl-2-(O-glycyl)glycolate) phosphazene], [NP(MPEG350)$_{0.93}$(GlyOEt)$_{0.61}$(GlyGlycOEt)$_{0.46}$]$_n$ The final polymer product [NP(MPEG350)$_{0.93}$(GlyOEt)$_{0.61}$(GlyGlycOEt)$_{0.46}$]$_n$ (5.2 g, yield: 58%) was obtained by the same procedure as in Example 1 using methoxy-poly(ethylene glycol) having a molecular weight of 350 (6.04 g, 17.3 mmol), sodium metal (0.44 g, 19.0 mmol), poly (dichlorophosphazene) (2.00 g, 17.3 mmol), triethylamine (1.75 g, 17.26 mmol), ethyl-2-(O-glycyl)glycolate ammonium oxalic acid salt (1.78 g, 4.31 mmol), triethylamine (3.49 g, 34.5 mmol) and glycine ethyl ester hydrogen chloride (2.40 g, 17.3 mmol).

Molecular formula: $C_{25}H_{49}N_3O_{14}P$
Elemental analysis (%): C, 40.53; H, 6.75; N, 5.55; P, 6.11
Theoretical value: C, 40.97; H, 6.75; N, 5.54; P, 5.92
$^1$H-NMR spectrum(CDCl$_3$, ppm):
  $\delta$1.1–1.3 (b, 6H, —NHCH$_2$COOCH$_2$C$\underline{H_3}$, —NHCH$_2$COOCH$_2$COOCH$_2$C$\underline{H_3}$),
  $\delta$3.4 (s, 3H, —O(CH$_2$CH$_2$O)$_7$C$\underline{H_3}$),
  $\delta$3.5–3.9 (b, 30H, —OC$\underline{H_2}$C$\underline{H_2}$O(C$\underline{H_2}$C$\underline{H_2}$O)$_6$CH$_3$, —NHC$\underline{H_2}$COOC$\underline{H_2}$CH$_3$, —NHC$\underline{H_2}$COOC$\underline{H_2}$COOCH$_2$CH$_3$),
  $\delta$4.0–4.4 (b, 6H, —OC$\underline{H_2}$CH$_2$O(CH$_2$CH$_2$O)$_6$CH$_3$, —NHCH$_2$COOC$\underline{H_2}$CH$_3$, —NHCH$_2$COOC$\underline{H_2}$COOCH$_2$CH$_3$),
  $\delta$4.5–4.7 (b, 2H, —NHCH$_2$COOC$\underline{H_2}$COOCH$_2$CH$_3$)
$^{31}$P-NMR spectrum(CDCl$_3$, ppm): $\delta$17.5
Average molecular weight($M_w$): 328000
Glass transition temperature(Tg): –52.9° C.
LCST: 63.5° C.

EXAMPLE 6

Preparation of Poly[(methoxy-poly(ethylene Glycol))(glycine Ethyl Ester)(ethyl-2-(O-glycyl)lactate) phosphazene], [NP(MPEG350)$_{0.95}$(GlyOEt)$_{0.83}$(GlyLacOEt)$_{0.22}$]$_n$ The final polymer product [NP(MPEG350)$_{0.95}$(GlyOEt)$_{0.83}$(GlyLacOEt)$_{0.22}$]$_n$ (5.1 g, yield: 61%) was obtained by the same procedure as in Example 1 using methoxy-poly(ethylene glycol) having a molecular weight of 350 (6.04 g, 17.3 mmol), sodium metal (0.44 g, 19.0 mmol), poly(dichlorophosphazene) (2.00 g, 17.3 mmol), triethylamine (6.99 g, 6.90 mmol), ethyl-2-(O-glycyl)lactate ammonium oxalic acid salt (0.76 g, 1.73 mmol), triethylamine (5.59 g, 55.2 mmol) and glycine ethyl ester hydrogen chloride (3.85 g, 27.6 mmol).

Molecular formula: $C_{26}H_{51}N_3O_{14}P$
Elemental analysis (%): C, 39.19; H, 6.81; N, 5.51; P, 6.50
Theoretical value: C, 39.79; H. 7.41; N, 5.51; P, 6.81
$^1$H-NMR spectrum(CDCl$_3$, ppm):
  $\delta$1.1–1.3 (b, 6H, —NHCH$_2$COOCH$_2$CH$_3$, —NHCH$_2$COOCH(CH$_3$)COOCH$_2$CH$_3$),
  $\delta$1.4–1.5 (b, 3H, —NHCH$_2$COOCH(CH$_3$)COOCH$_2$CH$_3$),
  $\delta$3.4 (s, 3H, —O(CH$_2$CH$_2$O)$_7$CH$_3$),
  $\delta$3.5–3.9 (b, 30H, —OCH$_2$CH$_2$O(CH$_2$CH$_2$O)$_6$CH$_3$, —NHCH$_2$COOCH$_2$CH$_3$, —NHCH$_2$COOCH(CH$_3$)COOCH$_2$CH$_3$),
  $\delta$4.0–4.4 (b, 6H, —OCH$_2$CH$_2$O(CH$_2$CH$_2$O)$_6$CH$_3$, —NHCH$_2$COOCH$_2$CH$_3$, —NHCH$_2$COOCH(CH$_3$)COOCH$_2$CH$_3$),
  $\delta$5.0–5.1 (b, 1H, —NHCH$_2$COOCH(CH$_3$)COOCH$_2$CH$_3$)
$^{31}$P-NMR spectrum(CDCl$_3$, ppm): $\delta$17.6
Average molecular weight($M_w$): 127000
Glass transition temperature(Tg): −53.1° C.
LCST: 66° C.

EXAMPLE 7
Preparation of Poly[(methoxy-poly(ethylene Glycol))(L-Glutamic Acid Ethylester)(glycine Ethyl Ester)(ethyl-2-(O-glycyl)glycolate)phosphazene], [NP(MPEG350)$_{0.27}$(GluOEt)$_{0.20}$(GlyOEt)$_{0.93}$(GlyGlycOEt)$_{0.10}$(OH)$_{0.50}$]$_n$ The sodium salt of methoxy-poly(ethylene glycol) was prepared by refluxing the mixture solution of methoxy-poly(ethylene glycol) having a molecular weight of 350 (1.81 g, 5.18 mmol) and sodium metal (0.13 g, 5.70 mmol) in dry tetrahydrofuran for 48 hours in nitrogen atmosphere. To a solution of poly(dichlorophosphazene) (2.00 g, 17.3 mmol) in tetrahydrofuran in a dry ice-acetone bath, the solution of sodium salt of methoxy-poly(ethylene glycol) prepared above was added dropwise. After 30 minutes, the dry ice-acetone bath was removed and the mixture was stirred at room temperature for 5 hours. To this mixture, a solution of triethylamine (0.70 g, 6.90 mmol) and ethyl-2-(O-glycyl)glycolate ammonium oxalic acid salt (0.71 g, 1.73 mmol) dissolved in acetonitrile (50 ml) was added, and the reaction mixture was reacted for 19 hours in an ice-water bath. Triethylamine (10.5 g, 103 mmol) and L-glutamic acid diethyl ester hydrogen chloride salt (12.4 g, 51.8 mmol) were added to this reaction mixture, which was stirred for 24 hours at room temperature. Finally, triethylamine(3.49, 34.5 mmol) and glycine ethyl ester hydrogen chloride salt (2.41 g, 17.3 mmol) were added to the reaction mixture, which was stirred for 48 hour at room temperature. The reaction mixture was centrifuged or filtered to remove the precipitates (Et$_3$N HCl or NaCl). The filtrate was concentrated at reduced pressure until a small amount of solvent remained. The concentrated product was dissolved in chloroform, to which excess amount of ethyl ether is or n-hexane was added to induce precipitation. After repeating this procedure 2~3 times, the precipitate was vacuum-dried to obtain 3.0 g of the final polymer product [NP(MPEG350)$_{0.27}$(GluOEt)$_{0.20}$(GlyOEt)$_{93}$(GlyGlycOEt)$_{0.10}$(OH)$_{0.50}$]$_n$ (yield: 58%).

Molecular formula: $C_{34}H_{66}N_4O_{17}P$
Elemental analysis (%): C, 38.56; H, 6.26; N, 9.11; P, 10.1
Theoretical value: C, 38.71; H, 6.87; N, 9.07; P, 9.82
$^1$H-NMR spectrum(CDCl$_3$, ppm):
  $\delta$1.1–1.4 (b, 12H, —NHCH$_2$COOCH$_2$CH$_3$, —NHCH$_2$COOCH$_2$COOCH$_2$CH$_3$, —NHCH(CH$_2$CH$_2$COOCH$_2$CH$_3$)COOCH$_2$CH$_3$),
  $\delta$2.0–2.2 (b, 2H, —NHCH(CH$_2$CH$_2$COOCH$_2$CH$_3$)COOCH$_2$CH$_3$),
  $\delta$2.5–2.6 (b, 2H, —NHCH(CH$_2$COOCH$_2$CH$_3$)COOCH$_2$CH$_3$),
  $\delta$3.4 (s, 3H, —O(CH$_2$CH$_2$O)$_7$CH$_3$),
  $\delta$3.5–3.9 (b, 31H, —OCH$_2$CH$_2$O(CH$_2$CH$_2$O)$_6$CH$_3$, —NHCH$_2$COOCH$_2$CH$_3$, —NHCH(CH$_2$CH$_2$COOCH$_2$CH$_3$)COOCH$_2$CH$_3$, —NHCH$_2$COOCH$_2$COOCH$_2$CH$_3$),
  $\delta$4.0–4.4 (b, 10H, —OCH$_2$CH$_2$O(CH$_2$CH$_2$O)$_6$CH$_3$, —NHCH$_2$COOCH$_2$CH$_3$, —NHCH(CH$_2$CH$_2$COOCH$_2$CH$_3$)COOCH$_2$CH$_3$, —NHCH$_2$COOCH$_2$COOCH$_2$CH$_3$),
  $\delta$4.5–4.7 (b, 2H, —NHCH$_2$COOCH$_2$COOCH$_2$CH$_3$)
$^{31}$P-NMR spectrum (CDCl$_3$, ppm): $\delta$17.9
Average molecular weight ($M_w$): 66000
Glass transition temperature(Tg): −74° C.
LCST: 27.5° C.

EXAMPLE 8
Preparation of Poly[(methoxy-poly(ethylene Glycol))(phenylalanine Ethylester)(glycine Ethyl Ester)(ethyl-2-(O-glycyl)glycolate)phosphazene], [NP(MPEG350)$_{0.59}$(PheOEt)$_{0.57}$(GlyOEt)$_{0.54}$(GlyGlycOEt)$_{0.20}$]$_n$ The final polymer [NP(MPEG350)$_{0.59}$(PheOEt)$_{0.57}$(GlyOEt)$_{0.54}$(GlyGlycOEt)$_{0.20}$]$_n$ (5.3 g, yield: 64%) was obtained by the same procedure as in Example 7 using methoxy-poly(ethylene glycol) having a molecular weight of 350 (4.2 g, 12.1 mmol), sodium metal (0.319, 13.3 mmol), poly(dichlorophosphazene) (2.00 g, 17.3 mmol), triethylamine (0.70 g, 6.90 mmol), ethyl-2-(O-glycyl)glycolate ammonium oxalic acid salt (0.71 g, 1.73 mmol), triethylamine (7.68 g, 75.9 mmol), phenylalanine ethyl ester hydrogen chloride salt (8.72 g, 38.0 mmol), triethylamine (3.49 g, 34.5 mmol) and glycine ethyl ester hydrogen chloride(2.40 g, 17.3 mmol).

Molecular formula: $C_{36}H_{64}N_4O_{16}P$
Elemental analysis (%): C, 44.36; H, 6.72; N, 6.34; P, 7.05
Theoretical value: C, 44.62; H, 7.01; N, 6.50; P, 6.95
$^1$H-NMR spectrum (CDCl$_3$, ppm):
  $\delta$0.8–1.05 (b, 3H, —NHCH(CH$_2$C$_6$H$_5$)COOCH$_2$CH$_3$),
  $\delta$1.1–1.3 (b, 6H, —NHCH$_2$COOCH$_2$CH$_3$, —NHCH$_2$COOCH$_2$COOCH$_2$CH$_3$),
  $\delta$2.9–3.2 (b, 2H, —NHCH(CH$_2$C$_6$H$_5$)COOCH$_2$CH$_3$),
  $\delta$3.4 (s, 3H, —OCH$_2$CH$_2$O(CH$_2$CH$_2$O)$_6$CH$_3$),
  $\delta$3.5–3.9 (b, 31H, —OCH$_2$CH$_2$O(CH$_2$CH$_2$O)$_6$CH$_3$—NHCH$_2$COOCH$_2$CH$_3$, —NHCH(CH$_2$C$_6$H$_5$)COOCH$_2$CH$_3$, —NHCH$_2$COOCH$_2$COOCH$_2$CH$_3$),
  $\delta$4.0–4.4 (b, 8H, —OCH$_2$CH$_2$O(CH$_2$CH$_2$O)$_6$CH$_3$, —NHCH$_2$COOCH$_2$CH$_3$, —NHCH(CH$_2$C$_6$H$_5$)COOCH$_2$CH$_3$, —NHCH$_2$COOCH$_2$COOCH$_2$CH$_3$),
  $\delta$4.5–4.7 (b, 2H, —NHCH$_2$COOCH$_2$COOCH$_2$CH$_3$),
  $\delta$7.0–7.3 (b, 5H, —NHCH(CH$_2$C$_6$H$_5$)COOCH$_2$CH$_3$)
$^{31}$P-NMR spectrum (CDCl$_3$, ppm): $\delta$16.8
Average molecular weight ($M_w$):140000
Glass transition temperature(Tg): −66.9° C.
LCST: 36.5° C.

EXAMPLE 9
Preparation of Poly[(methoxy-poly(ethylene Glycol))(phenylalanine Ethylester)(glycine Ethyl Ester)(ethyl-2-(O-glycyl)lactate)phosphazene], [NP(MPEG350)$_{0.59}$(PheOEt)$_{0.64}$(GlyOEt)$_{0.48}$(GlyLacOEt)$_{0.29}$]$_n$ The final polymer [NP(MPEG350)$_{0.59}$(PheOEt)$_{0.64}$(GlyOEt)$_{0.48}$(GlyLacOEt)$_{0.29}$]$_n$ (6.67 g, yield: 89%) was obtained by the same procedure as in Example 7 using methoxy-poly(ethylene glycol) having a molecular weight of 350 (4.2 g, 12.1 mmol), sodium metal (0.31 g, 13.3 mmol), poly(dichlorophosphazene) (2.00 g, 17.3 mmol), triethylamine (0.70 g, 6.90 mmol), ethyl-2-(O-glycyl)lactate ammonium oxalic acid salt (0.80 g, 1.73 mmol), triethylamine (7.68 g, 75.9 mmol), phenylalanine ethyl ester hydrogen chloride salt (8.72 g, 38.0 mmol), triethylamine (3.49 g, 34.5 mmol) and glycine ethyl ester hydrogen chloride(2.40 g, 17.3 mmol).

Molecular formula: $C_{37}H_{66}N_4O_{16}P$
Elemental analysis (%): C, 47.43; H, 6.93; N, 7.64; P, 7.38
Theoretical value: C, 47.80; H, 6.52; N, 7.03; P, 7.05
$^1$H-NMR spectrum(CDCl$_3$, ppm):
δ0.8–1.05 (b, 3H, —NHCH(CH$_2$C$_6$H$_5$)COOCH$_2$CH$_3$),
δ1.1–1.3 (b, 6H, —NHCH$_2$COOCH$_2$CH$_3$, —NHCH$_2$COOCH(CH$_3$)COOCH$_2$CH$_3$),
δ1.3–1.5 (b, 3H, —NHCH$_2$COOCH(CH$_3$)COOCH$_2$CH$_3$),
δ2.9–3.2 (b, 2H, —NHCH(CH$_2$C$_6$H$_5$)COOCH$_2$CH$_3$),
δ3.4 (s, 3H, —OCH$_2$CH$_2$O(CH$_2$CH$_2$O)$_6$CH$_3$),
δ3.5–3.9 (b, 31H, —OCH$_2$CH$_2$O(CH$_2$CH$_2$O)$_6$CH$_3$—NHCH$_2$COOCH$_2$CH$_3$, —NHCH(CH$_2$C$_6$H$_5$)COOCH$_2$CH$_3$, —NHCH$_2$COOCH(CH$_3$)COOCH$_2$CH$_3$)
δ4.0–4.4 (b, 8H, —OCH$_2$CH$_2$O(CH$_2$CH$_2$O)$_6$CH$_3$, —NHCH$_2$COOCH$_2$CH$_3$, —NHCH(CH$_2$C$_6$H$_5$)COOCH$_2$CH$_3$, —NHCH$_2$COOCH(CH$_3$)COOCH$_2$CH$_3$),
δ4.9–5.1 (b, 1H, —NHCH$_2$COOCH(CH$_3$)COOCH$_2$CH$_3$),
δ7.0–7.3 (b, 5H, —NHCH(CH$_2$C$_6$H$_5$)COOCH$_2$CH$_3$)
$^{31}$P-NMR spectrum (CDCl$_3$, ppm): δ16.6
Average molecular weight (M$_w$): 85000
Glass transition temperature(Tg): −54° C.
LCST: 31° C.

EXAMPLE 10
Preparation of Poly[(methoxy-poly(ethylene Glycol))(phenylalanine Ethylester)(alanineethylester)(ethyl-2-(O-glycyl)glycolate)phosphazene], [NP(MPEG350)$_{0.64}$(PheOEt)$_{0.68}$(AlaOEt)$_{0.46}$(GlyGlycOEt)$_{0.22}$]$_n$ The final polymer [NP(MPEG350)$_{0.64}$(PheOEt)$_{0.68}$(AlaOEt)$_{0.46}$(GlyGlycOEt)$_{0.22}$]$_n$ (6.73 g, yield: 77%) was obtained by the same procedure as in Example 7 using methoxy-poly(ethylene glycol) having a molecular weight of 350 (4.2 g, 12.1 mmol), sodium metal (0.31 g, 13.3 mmol), poly(dichlorophosphazene) (2.00 g, 17.3 mol), tri-ethylamine (0.70 g, 6.90 mmol), ethyl-2-(O-glycyl)glycolate ammonium oxalic acid salt (0.71 g, 1.73 mmol), triethylamine (3.49 g, 34.5 mmol), phenylalanine ethyl ester hydrogen chloride salt(g, 38.1 mmol), triethylamine (3.49 g, 34.5 mmol) and alanine ethyl ester hydrogen chloride(2.65 g, 17.3 mmol).

Molecular formula: $C_{37}H_{66}N_4O_{16}P$
Elemental analysis (%): C, 49.32; H, 7.25; N, 6.31; P, 7.25
Theoretical value: C, 49.45; H, 7.61; N, 6.35; P, 7.36
$^1$H-NMR spectrum(CDCl$_3$, ppm):
δ0.8–1.05 (b, 3H, —NHCH(CH$_2$C$_6$H$_5$)COOCH$_2$CH$_3$),
δ1.1–1.3 (b, 6H, —NHCH(CH$_3$)COOCH$_2$CH$_3$, —NHCH$_2$COOCH$_2$COOCH$_2$CH$_3$),
δ1.5–1.8 (b, 3H, —NHCH(CH$_3$)COOCH$_2$CH$_3$),
δ2.9–3.2 (b, 2H, —NHCH(CH$_2$C$_6$H$_5$)COOCH$_2$CH$_3$),
δ3.4 (s, 3H, —OCH$_2$CH$_2$O(CH$_2$CH$_2$O)$_6$CH$_3$),
δ3.5–3.9 (b, 31H, —OCH$_2$CH$_2$O(CH$_2$CH$_2$O)$_6$CH$_3$—NHCH(CH$_3$)COOCH$_2$CH$_3$, —NHCH(CH$_2$C$_6$H$_5$)COOCH$_2$CH$_3$, —NHCH$_2$COOCH$_2$COOCH$_2$CH$_3$),
δ4.0–4.4 (b, 8H, —OCH$_2$CH$_2$O(CH$_2$CH$_2$O)$_6$CH$_3$, —NHCH(CH$_3$)COOCH$_2$CH$_3$, —NHCH(CH$_2$C$_6$H$_5$)COOCH$_2$CH$_3$, —NHCH$_2$COOCH$_2$COOCH$_2$CH$_3$),
δ4.5–4.7 (b, 2H, —NHCH$_2$COOCH$_2$COOCH$_2$CH$_3$),
δ7.0–7.3 (b, 5H, —NHCH(CH$_2$C$_6$H$_5$)COOCH$_2$CH$_3$)
$^{31}$P-NMR spectrum (CDCl$_3$, ppm): δ16.5
Average molecular weight (M$_w$): 344000
Glass transition temperature (Tg): −56.8° C.
LCST: 26.5° C.

EXAMPLE 11
Preparation of Poly[(methoxy-poly(ethylene Glycol))(phenylalanine Ethyl Ester)(glycine Ethyl Ester)phosphazene], [NP(MPEG350)$_{0.80}$(PheOEt)$_{0.87}$(GlyOEt)$_{0.33}$]$_n$ The final polymer [NP(MPEG350)$_{0.80}$(PheOEt)$_{0.87}$(GlyOEt)$_{0.33}$]$_n$ (6.85 g, yield: 76%) was obtained by the same procedure as in Example 7 using (methoxy-poly(ethylene glycol)) having a molecular weight of 350 (4.8 g, 13.8 mmol), sodium metal (0.35 g, 15.19 mmol), poly(dichlorophosphazene) (2.00 g, 17.3 mmol), triethylamine (8.38 g, 82.8 mmol), phenylalanine ethyl ester hydrogen chloride salt (9.52 g, 41.4 mmol), triethylamine (3.49 g, 34.5 mmol) and glycine ethyl ester hydrogen chloride(2.40 g, 17.3 mmol).

Molecular formula: $C_{30}H_{53}N_3O_{12}P$
Elemental analysis (%): C, 51.37; H, 7.42; N, 6.48; P, 7.30
Theoretical value: C, 52.40; H, 7.53; N, 6.45; P, 7.20
$^1$H-NMR spectrum(CDCl$_3$, ppm):
δ0.8–1.05 (b, 3H, —NHCH(CH$_2$C$_6$H$_5$)COOCH$_2$CH$_3$),
δ1.1–1.2 (b, 3H, —NHCH$_2$COOCH$_2$CH$_3$),
δ2.9–3.2 (b, 2H, —NHCH(CH$_2$C$_6$H$_5$)COOCH$_2$CH$_3$),
δ3.4 (s, 3H, —OCH$_2$CH$_2$O(CH$_2$CH$_2$O)$_6$CH$_3$),
δ3.5–3.9 (b, 28H, —OCH$_2$CH$_2$O(CH$_2$CH$_2$O)$_6$CH$_3$, —NHCH$_2$COOCH$_2$CH$_3$),
δ4.0–4.4 (b, 6H, —OCH$_2$CH$_2$O(CH$_2$CH$_2$O)$_6$CH$_3$, —NHCH(CH$_2$C$_6$H$_5$)COOCH$_2$CH$_3$ —NHCH$_2$COOCH$_2$CH$_3$),
δ7.0–7.3 (b, 5H, —NHCH(CH$_2$C$_6$H$_5$)COOCH$_2$CH$_3$)
$^{31}$P-NMR spectrum (CDCl$_3$, ppm): δ16.7
Average molecular weight (M$_w$): 44000
Glass transition temperature(Tg): −50° C.
LCST: 31° C.

EXAMPLE 12
Preparation of Poly[(α-amino-ω-methoxy-poly(ethylene Glycol))(phenylalanine Ethylester)phosphazene], [NP(AMPEG350)$_{1.22}$(PheOEt)$_{0.78}$]

To a solution of poly(dichlorophosphazene)(2.00 g, 17.3 mmol) in tetrahydrofuran in dry ice-acetone bath, triethylamine (3.49 g, 34.5 mmol) and phenylalanine ethyl ester hydrogen chloride salt (3.96 g, 17.3 mmol) were added and the reaction mixture was reacted for 48 hours at room temperature. To this mixture, triethylamine (3.49 g, 34.5 mmol) and α-amino-ω-methoxy-poly(ethylene glycol) with molecular weight of 350 (12.1 g, 34.5 mmol) were added and the reaction mixture was reacted for 48 hours at 40° C. The reaction mixture was centrifuged or filtered to remove the precipitates ($Et_3N \cdot HCl$ or NaCl). The filtrate was concentrated at reduced pressure until a small amount of solvent remained. The concentrated product was dissolved in chloroform, to which excess amount of ethyl ether or n-hexane was added to induce precipitation. After repeating this procedure 2~3 times, the precipitate was vacuum-dried to obtain 9.63 g of the final polymer product [$NP(AMPEG350)_{1.22}(PheOEt)_{0.78}$] (yield: 90%)

Molecular formula: $C_{26}H_{46}N_3O_9P$
Elemental analysis (%): C, 52.77; H, 8.31; N, 6.28; P, 4.84
Theoretical value: C, 52.65; H, 8.11; N, 6.14; P, 4.99
$^1$H-NMR spectrum($CDCl_3$, ppm):

δ0.8–1.2 (b, 3H, —NHCH($CH_2C_6H_5$)COOCH$_2$CH$_3$),
δ2.9–3.2 (b, 4H, —NHCH($CH_2C_6H_5$)COOCH$_2$CH$_3$, —NHCH$_2$CH$_2$O(CH$_2$CH$_2$O)$_6$CH$_3$),
δ3.4 (s, 3H, —NHCH$_2$CH$_2$O(CH$_2$CH$_2$O)$_6$CH$_3$),
δ3.5–3.9 (b, 27H, —NHCH$_2$CH$_2$O(CH$_2$CH$_2$O)$_6$CH$_3$, —NHCH(CH$_2$C$_6$H$_5$)COOCH$_2$CH$_3$),
δ4.0–4.4 (b, 2H, —NHCH(CH$_2$C$_6$H$_5$)COOCH$_2$CH$_3$),
δ7.0–7.3 (b, 5H, —NHCH(CH$_2$C$_6$H$_5$)COOCH$_2$CH$_3$),
$^{31}$P-NMR spectrum($CDCl_3$, ppm): δ17.9
Average molecular weight ($M_w$): 176000
Glass transition temperature(Tg): −60.9° C.
LCST: 38.5° C.

EXAMPLE 13

Preparation of Poly[(α-amino-ω-methoxy-poly(ethylene Glycol))(valine Ethyl Ester)(glycine Ethyl Ester) phosphazene], [$NP(AMPEG350)_{0.74}(ValOEt)_{0.98}(GlyOEt)_{0.28}$]

The final polymer [$NP(AMPEG350)_{0.74}(ValOEt)_{0.98}(GlyOEt)_{0.28}$] (4.90 g, yield: 60%) was obtained by the same procedure as in Example 12 using poly(dichlorophosphazene) (2.00 g, 17.3 mmol), triethylamine (3.84 g, 38.0 mmol), valine ethyl ester hydrogen chloride salt (4.09 g, 22.5 mmol), triethylamine (3.49 g, 34.5 mmol), α-amino-ω-methoxy-poly(ethylene glycol) having a molecular weight of 350 (9.3 g, 26.6 mmol), triethylamine (3.49 g, 34.5 mmol) and glycine ethyl ester hydrogen chloride(2.40 g, 17.3 mmol).

Molecular formula: $C_{26}H_{54}N_4O_{11}P$
Elemental analysis (%): C, 48.2; H, 8.25; N, 8.52; P, 6.91
Theoretical value: C, 48.4; H, 8.65; N, 8.88; P, 6.55
$^1$H-NMR spectrum($CDCl_3$, ppm):

δ0.7–1.1 (s, 6H, —NHCH(CH(CH$_3$)$_2$)COOCH$_2$CH$_3$),
δ1.1–1.3 (s, 6H, —NHCH(CH(CH$_3$)$_2$)COOCH$_2$CH$_3$, —NHCH$_2$COOCH$_2$CH$_3$),
δ1.9–2.1 (b, 1H, —NHCH(CH(CH$_3$)$_2$)COOCH$_2$CH$_3$),
δ2.9–3.2 (b, 2H, —NHCH$_2$CH$_2$O(CH$_2$CH$_2$O)$_6$CH$_3$),
δ3.4 (s, 3H, —NHCH$_2$CH$_2$O(CH$_2$CH$_2$O)$_6$CH$_3$),
δ3.5–3.9 (b, 29H, —NHCH$_2$CH$_2$O(CH$_2$CH$_2$O)$_6$CH$_3$, —NHCH(CH(CH$_3$)$_2$)COOCH$_2$CH$_3$, —NHCH$_2$COOCH$_2$CH$_3$),
δ4.0–4.4 (b, 4H, —NHCH(CH(CH$_3$)$_2$)COOCH$_2$CH$_3$, —NHCH$_2$COOCH$_2$CH$_3$),
$^{31}$P-NMR spectrum($CDCl_3$, ppm): δ18.9
Glass transition temperature(Tg): −65° C.
LCST: 25.5° C.

EXAMPLE 14

Preparation of Poly[(α-amino-ω-methoxy-poly(ethylene Glycol)) (leucine Ethyl Ester)(glycine Ethyl Ester) phosphazene], [$NP(AMPEG350)_{0.84}(LeuOEt)_{0.88}(GlyOEt)_{0.28}$]

The final polymer [$NP(AMPEG350)_{0.74}(LeuOEt)_{0.98}(GlyOEt)_{028}$] (5.42 g, yield: 62%) was obtained by the same procedure as in Example 12 using poly(dichlorophosphazene) (2.00 g, 17.3 mmol), triethylamine (4.1 g, 41.4 mmol), leucine ethyl ester hydrogen chloride salt (4.05 g, 20.7 mmol), triethylamine (3.49 g, 34.5 mmol), α-amino-ω-methoxy-poly(ethylene glycol) having a molecular weight of 350 (12.08 g, 34.5 mmol), triethylamine (3.49 g, 34.5 mmol) and glycine ethyl ester hydrogen chloride(2.40 g, 17.3 mmol).

Molecular formula: $C_{27}H_{56}N_4O_{11}P$
Elemental analysis(%): C, 49.2; H, 8.89; N, 8.31; P, 6.48
Theoretical value: C, 49.3; H, 8.80; N, 8.30; P, 6.12
$^1$H-NMR spectrum($CDCl_3$, ppm):

δ0.8–1.0 (s, 6H, —NHCH(CH$_2$CH(CH$_3$)$_2$)COOCH$_2$CH$_3$),
δ6 1.1–1.3 (s, 6H, —NHCH(CH$_2$CH(CH$_3$)$_2$)COOCH$_2$CH$_3$, —NHCH$_2$COOCH$_2$CH$_3$),
δ1.4–1.6 (b, 2H, —NHCH(CH$_2$CH(CH$_3$)$_2$)COOCH$_2$CH$_3$),
δ1.6–1.9 (b, 1H, —NHCH(CH$_2$CH(CH$_3$)$_2$)COOCH$_2$CH$_3$),
δ2.9–3.2 (b, 2H, —NHCH$_2$CH$_2$O(CH$_2$CH$_2$O)$_6$CH$_3$),
δ3.4 (s, 3H, —NHCH$_2$CH$_2$O(CH$_2$CH$_2$O)$_6$CH$_3$),
δ3.5–3.9 (b, 29H, —NHCH$_2$CH$_2$O(CH$_2$CH$_2$O)$_6$CH$_3$, —NHCH(CH$_2$CH(CH$_3$)$_2$)COOCH$_2$CH$_3$, —NHCH$_2$COOCH$_2$CH$_3$),
δ4.0–4.4 (b, 4H, —NHCH(CH$_2$CH(CH$_3$)$_2$)COOCH$_2$CH$_3$, —NHCH$_2$COOCH$_2$CH$_3$),
$^{31}$P-NMR spectrum($CDCl_3$, ppm): δ17.8
Glass transition temperature(Tg): −53° C.
LCST: 42° C.

Degradation Experiment of Temperature-sensitive Polyphosphazenes

Degradation experiment of temperature-sensitive polyphosphazenes of the present invention was carried out as follows. Polyphosphazenes were dissolved in buffer solutions of pH=5, 7.4, and 10, which were stored in shaking water-bath at 37° C. Decrease of their molecular weight depending on the storage time was measured using gel permeation chromatography (GPC). The results are summarized in Table 1. And chemical analysis revealed that the degraded products in the solution are non-toxic phosphate, ammonium ion and ethanol. Accordingly, the polyphosphazenes are presumed to degrade to phosphate, ammonium ion, amino acid, and ethanol, which are not harmful to human beings.

The present invention provides biodegradable temperature-sensitive polymers. Polyphosphazenes of the present invention have temperature-sensitivity and biodegradability simultaneously. Also phase transition temperature and degradation rate can be controlled. Accordingly, the polymers of the present invention are expected to be useful in many fields including as biomaterials for drug delivery systems.

TABLE 1

Results of degradation experiment of temperature-sensitive polyphosphazenes

| | | Changes in the molecular weight (%) | | | | | | |
|---|---|---|---|---|---|---|---|---|
| Polymers | pH | 0 (day) | 3 (day) | 5 (day) | 7 (day) | 11 (day) | 17 (day) | 23 (day) |
| Example 5 | 5 | 100 | 65 | 29 | 23 | | | |
| | 7.4 | 100 | 86 | 42 | 23 | 11.7 | 5.9 | 4.3 |
| | 10 | 100 | 80 | 56 | 43.6 | | | |
| Example 3 | 7.4 | 100 | | 73 | | 40 | 29 | 19 |
| Example 2 | 7.4 | 100 | | 67 | | 23 | 14 | 8 |

We claim:
1. Polyphosphazenes represented by Formula 1:

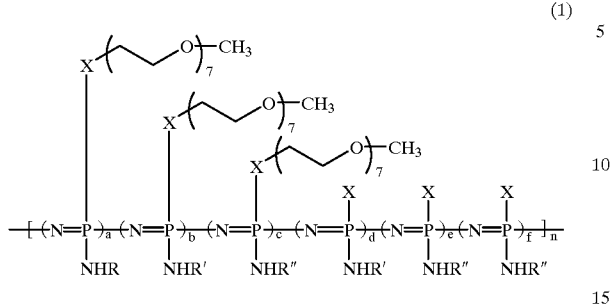

wherein X is O or NH, NHR is a depsipeptide selected from the group consisting of $NHCH_2COOCH_2COOC_2H_5$ or $NHCH_2COOCH(CH_3)COOC_2H_5$, NHR' is an amino acid ethylester selected from the group consisting of $NHCH(CH_2CH_2COOC_2H_5)COOC_2H_5$, $NHCH(C_7H_7)COOC_2H_5$, $NHCH(CH(CH_3)_2)COOC_2H_5$, or $NHCH(CH_2CH(CH_3)_2)COOC_2H_5$, NHR" is $NHCH_2COOC_2H_5$ or $NHCH(CH_3)COOC_2H_5$, and a, b, c, d, e and f are mole fractions of each copolymer that have values between 0~1.0 with a relationship a+b+c+d+e+f=1.0 and n is a degree of polymerization of the polyphosphazene and is between 100~1000.

2. A process of preparing polyphosphazenes of Formula 1 comprising the steps of:

a) reacting polydichlorophosphazene of Formula 3 with alkali metal salt of methoxy-poly(ethylene glycol) of Formula 4 or α-amino-ω-methoxy-poly(ethylene glycol) of Formula 5 in a mole ratio of 1:0.3~1.5;

b) reacting the product of step a) with depsipeptide of Formula 6 and glutamic acid ethyl ester, phenylalanine ethyl ester, valine ethyl ester, or leucine ethyl ester of Formula 7 in a mole ratio of 1:0.1~2 in an organic solvent; and c) reacting glycine ethyl ester or alanine ethyl ester of Formula 8 with an unsubstituted chlorine

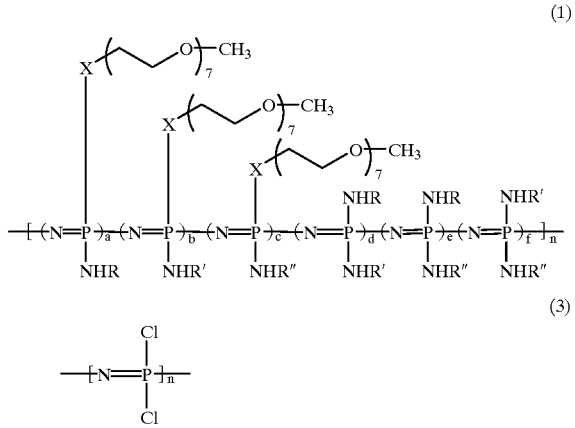

-continued

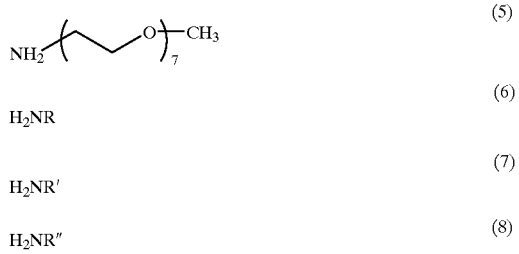

wherein X is O or NH NHR is a depsipeptide selected from the group consisting of $NHCH_2COOCH_2COOC_2H_5$ and $NHCH_2COOCH(CH_3)COOC_2H_5$, NHR' is an amino acid ethyl ester selected from the group consisting of $NHCH(CH_2CH_2COOC_2H_5)COOC_2H_5$, $NHCH(C_7H_7)COOC_2H_5$, $NHCH(CH(CH_3)_2)COOC_2H_5$, or $NHCH(CH_2CH(CH_3)_2)COOC_2H_5$, NHR" is $NHCH_2COOC_2H_5$ or $NHCH(CH_3)COOC_2H_5$, and a, b, c, d, e and f are mole fractions of each copolymer that have values between 0~1.0 with a relationship a+b+c+d+e+f=1.0 and n is a degree of polymerization of the polyphosphazene and is between 100~1000.

3. The process according to claim 2, wherein the alkali metal salt of Formula 4 is obtained by reacting methoxy-poly(ethylene glycol) with 1.1~2.0 equivalent weight of alkali metal.

4. The process according to claim 2, wherein polydichlorophosphazene of Formula 3 is reacted first with the alkali metal salt of methoxy-poly(ethylene glycol) of Formula 4 and then the depsipeptide of Formula 6 and amino acid ester of Formula 7 are reacted in the presence of triethylamine to replace the unsubstituted chlorine.

5. The process according to claim 2, wherein polydichlorophosphazene of Formula 3 is reacted first with the depsipeptide of Formula 6 and the amino acid ester of Formula 7 and then the α-amino-ω-methoxy-poly(ethylene glycol) of Formula 5 is reacted to replace the unsubstituted chlorine in the presence of the triethylamine.

6. The process according to claim 2, wherein depsipeptide of Formula 6 is an oxalic acid salt form, and amino acid esters of Formulas 7 and 8 are hydrogen chloride or sulfate salt form in the reactions.

7. The process according to claim 3, wherein depsipeptide of Formula 6 is an oxalic acid salt form, and amino acid esters of Formulas 7 and 8 are hydrogen chloride or sulfate salt form in the reactions.

8. The process according to claim 4, wherein depsipeptide of Formula 6 is an oxalic acid salt form, and amino acid esters of Formulas 7 and 8 are hydrogen chloride or sulfate salt form in the reactions.

9. The process according to claim 5, wherein depsipeptide of Formula 6 is an oxalic acid salt form, and amino acid esters of Formulas 7 and 8 are hydrogen chloride or sulfate salt form in the reactions.

10. The process according to claim 2, wherein reaction solvent is selected from a group of organic solvents including tetrahydrofuran, toluene and benzene.

11. The process according to claim 3, wherein reaction solvent is selected from a group of organic solvents including tetrahydrofuran, toluene and benzene.

12. The process according to claim 4, wherein reaction solvent is selected from a group of organic solvents including tetrahydrofuran, toluene and benzene.

13. The process according to claim 5, wherein reaction solvent is selected from a group of organic solvents including tetrahydrofuran, toluene and benzene.

14. The process according to claim 2, wherein the product is precipitated by adding an excess amount of ethyl ether or n-hexane.

15. The process according to claim 3, wherein the product is precipitated by adding an excess amount of ethyl ether or n-hexane.

16. The process according to claim 4, wherein the product is precipitated by adding an excess amount of ethyl ether or n-hexane.

17. The process according to claim 5, wherein the product is precipitated by adding an excess amount of ethyl ether or n-hexane.

\* \* \* \* \*